July 11, 1961  W. T. EPPLER  2,991,504
EXTRUSION DIE

Filed July 20, 1959  2 Sheets-Sheet 1

INVENTOR
W. T. EPPLER
By S. Gundersen
ATTORNEY

July 11, 1961 W. T. EPPLER 2,991,504
EXTRUSION DIE
Filed July 20, 1959 2 Sheets-Sheet 2
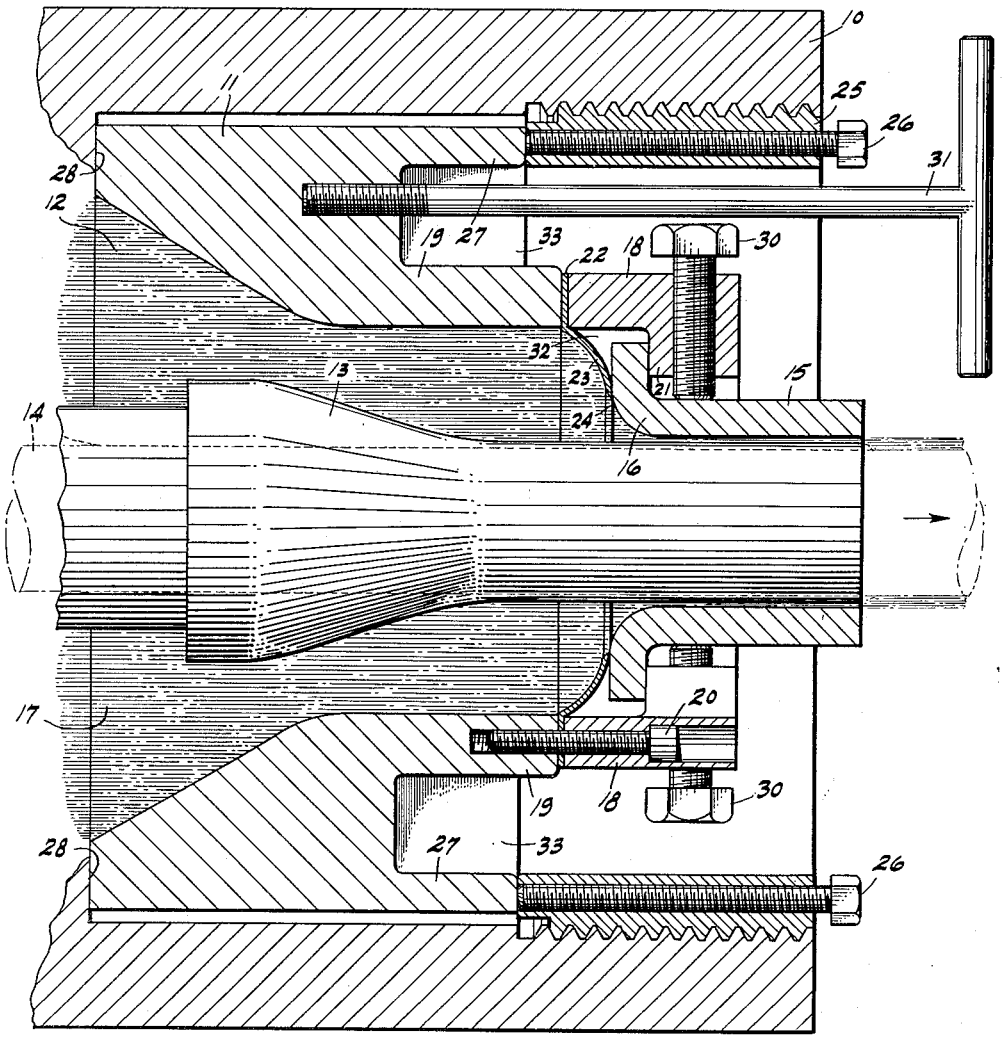
_Fig. 2_
INVENTOR
W. T. EPPLER
By S. Gundersen
ATTORNEY

United States Patent Office 2,991,504
Patented July 11, 1961

2,991,504
EXTRUSION DIE
Walter T. Eppler, Cranford, N.J., assignor to Western Electric Company, Incorporated, New York, N.Y., a corporation of New York
Filed July 20, 1959, Ser. No. 828,337
2 Claims. (Cl. 18—13)

This invention relates to extruding apparatus and particularly to a die whose adjustment is not disturbed when removed from the extruder.

Extruders, such as the type used in applying plastic sheaths about a cable core, have included in their head portion a large cavity containing a core tube for guiding the cable to be sheathed and a die surrounding the tube in order to form the sheath around the cable. Concentric sheathing is obtained by disposing the die eccentrically with respect to the core tube so that the flow resistance of the plastic is substantially constant about the core tube. The die position is the same for any one cable diameter but differs for each of the many cable diameters. Consequently when different size cables are sheathed, appropriate size dies must be placed in the head.

Heretofore, a plurality of adjusting screws, extending inwardly from the external surface of the extruder head were rotated to move a die holder laterally within the head cavity about the die in order to obtain the proper eccentric position of the die. However, each time the die was removed from the extruder, the adjusting screws were backed off to release the die holder from the die and consequently the adjustment for the concentric sheathing was disturbed. Thus, with each die replacement, defective non-concentric sheathing was applied to hundreds of feet of cable and much labor time consumed to reacquire the proper adjustment of the die.

The object of this invention is an extrusion die capable of retaining its initial setting with respect to the tube core upon its repeated reinstallation in the extruder.

Another object of this invention is a movable leakproof die adapted to be readily fixed on and removed from an extruder.

According to the invention, an adjustable extrusion die is mounted in a die holder, the latter being adapted to be removed from and subsequently reinserted into the head structure of an extruder in a definite orientation once the intitial adjustment of the die on the die holder has been made to obtain a concentric extrusion about the article.

In a preferred embodiment, a laterally movable die is supported in a removably fixed die holder having a base and head member positioned about an extrusion core tube. The die is adjusted by two pairs of opposing adjusting screws extending through the head member which is secured to an inner boss of the base member. A clamp ring locks an outer boss of the holder to the extruder to hold the die and die holder in position. The die and holder are removed from the extruder without disturbing the die adjustment by unscrewing the clamp ring and pulling the base member outwardly from the extruder.

Other objects and a fuller understanding of the invention may be had by referring to the following description and claims, taken in conjunction with the accompanying drawings, in which:

FIG. 2 is a sectional view taken along the line 2—2 of FIG. 1.

Figure 1:
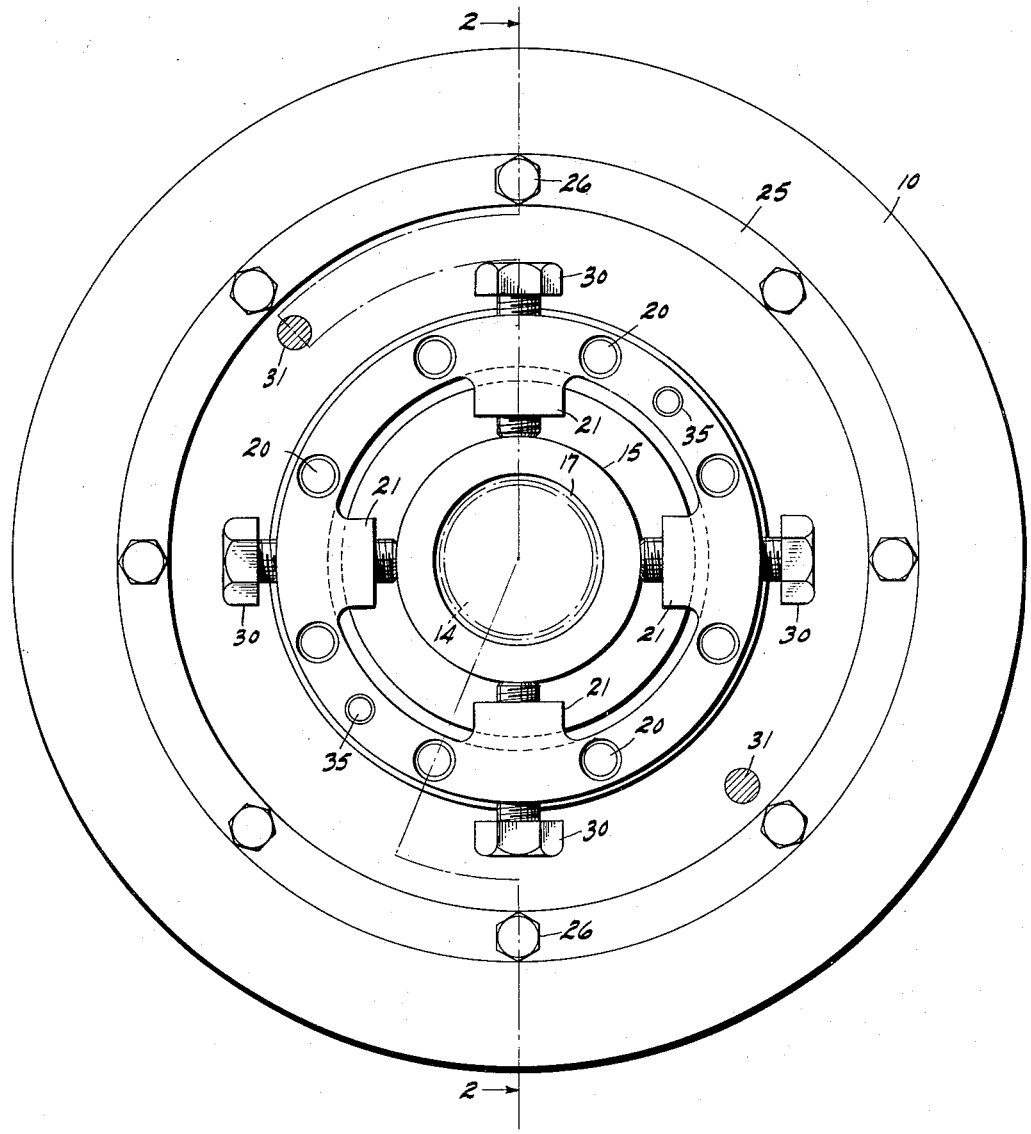
FIG. 1 is a plan view of the die and die holder embodying the invention.

With respect to the drawing, the invention is illustrated as being incorporated in a head or housing structure 10 of an extrusion apparatus (not shown). A fixed die holder base 11, having an internal cavity 12, is positioned concentrically about a core tube 13 extending through the head 10 for guiding an article 14, such as a cable, rod, tube or the like therethrough. However, if simple plastic tubing extrusions are desired, such as garden hoses, the core tube can be the conventional type mandrel utilized.

A movable die 15, having a flanged end portion 16, surrounds the exit end of the core 13 and is in spaced relationship thereto providing a passage for the extrusion material 17 to flow therein. A die holder head 18, disposed about the die 15, is secured to an inner die retaining boss 19 of the die base 11 by screws 20. The die holder head 18 has a flanged portion 21 engaging one side of the die flange 16. Intermediate the inner retaining boss 19 and head 18 is a cup-shaped diaphragm 22 concentrically disposed about the core tube 13 and having an arcuate portion 23 which engages the other side of the die flange 16. The diaphragm preferably is of a resilient metal such as beryllium copper so that the pressure of the extrusion material 17 forces the diaphragm against the die 15 and secures it against axial movement. Further, the diaphragm serves as a seal 24 between the head structure 10 and die 15 regardless of the die adjustment, as hereinafter explained.

A threaded clamp ring 25 is screwed to the extruder head 10 to hold the die holder base 11 in a fixed position. It is to be understood that any type clamping arrangement, such as bolts or the like can be utilized to secure the die holder to the extruder head. Clamp screws 26 are inserted through the ring 25 to engage the outer die retaining boss 27 and force the holder base 11 against the extruder head 10 so as to provide a seal at 28 for preventing any extrusion material from entering into the head and thereby insure an accurate seating of the die holder in the extruder cavity 12.

Two pairs of opposing laterally spaced adjusting screws 30 extend transversely through the die holder head 18 to contact the die 15 for the lateral adjustment thereof. The first time a particular size die is utilized in an extrusion operation, an initial adjustment of the die in the holder is obtained by turning the screws 30 empirically until a proper eccentric relationship of the die, with respect to the core tube 13, is established and the formation of a concentric sheath about the article 14 results. Once this adjustment has been made, the die can be removed from and subsequently reinserted into the extruder head without disturbing the initial adjustment as the die and holder are adapted to remain as one unit. The orientation of the die holder with respect to the core tube is maintained by positioning the holder on a pair of diametrically opposed dowel pins 35. The die and holder are removed from the extruder head simply by unscrewing the clamp ring 25 and pulling outwardly on a pair of removable hand levers 31 affixed to the base holder 11. In this manner, neither the die adjustment nor the orientation of the die and holder are disturbed and consequently the unit can be reinserted into the extruder to produce acceptable extrusions immediately when starting a new run.

During the turning of the screws 30, the die flange 16 is slidable along the die holder head flange 21 and arcuate surface 23 of the diaphragm 22 creating the seal 24 therebetween to prevent any leakage of extrusion material 17 into the die adjustment cavity 32. In this manner, clogging of the adjustment cavity is eliminated, adjusting the die is facilitated, and cleaning the die is simplified. In the event that the seal 24 becomes worn or the screws 20 are not properly secured, extrusion material leaking from the seal will overflow into passages 33, disposed between the die retaining bosses 19 and 27 on the die holder 11, and not into the sliding surfaces of the die and its holder.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In the housing of an extrusion apparatus having a core tube through which an article to be extruded passes, a die surrounding the core and having a flange end portion, a die holder consisting of a base and head member, the base member having an inner boss for holding extrusion material about the core and an outer boss, the head member connected to the base member and having a flange in engagement with one side of the die flange, movable means on the head member for laterally adjusting the die, a diaphragm intermediate the base and head members and having a dished portion contacting the other side of the die flange under pressure from the extrusion material to secure the die against axial movement and prevent the material from leaking between the contacting surfaces of the flanges, and means for applying pressure against the outer boss for removably fixing the die in the head.

2. In the housing of an extrusion apparatus having a tube core through which an article to be extruded passes, a movable die surrounding the core defining a passage for the extruded material therebetween and having a flange end portion, a die holder including a base and head member having an internal cavity for surrounding the core, the base member having an inner and outer boss defining a passage therebetween and the head member having a flanged surface engaging one side of the die flange, means for securing the head member to the inner boss of the base member, a diaphragm intermediate the inner boss and head member having an arcuate surface engaging the other side of the die flange forming a die adjustment cavity and serving as a seal under pressure of the extruded material to prevent the material from entering said cavity, a plurality of equally spaced adjusting screws radially extending through the flange head for moving the die laterally on the head flange and diaphragm to adjust the die in an eccentric relationship with respect to the core tube so that a concentric extrusion is formed about the article, a clamp ring having an external threaded surface screwed to the housing and a body portion engaging the outer boss for securing the base member to the housing, means for applying longitudinal forces to equalize the pressure against the outer boss and force it against the extrusion housing to insure an accurate sealing of the die holder in the housing, and means associated with the outer boss for removing and inserting the die and holder without disturbing the die adjustment.

References Cited in the file of this patent

UNITED STATES PATENTS

| 1,196,648 | Bleecker | Aug. 29, 1916 |
| 2,821,745 | Patton | Feb. 4, 1958 |